Patented July 4, 1950

2,514,172

UNITED STATES PATENT OFFICE 2,514,172

ESTERS OF DIHYDRO- AND TETRAHYDRO-PYRAN CARBOXYLIC ACIDS, AND POLYMERS OF THE SAME

Richard R. Whetstone, Oakland, Seaver A. Ballard, Berkeley, and Clarence J. Ott, San Francisco, Calif., assignors to Shell Development Company, San Francisco, Calif., a corporation of Delaware No Drawing. Application October 28, 1946, Serial No. 706,102

15 Claims. (Cl. 260—333)

This invention relates to the novel compounds, tetrahydropyran-2-carboxylic acid and 3,4-dihydro-1,2-pyran-2-carboxylic acid, and to a process whereby they advantageously may be prepared from 3,4-dihydro-1,2-pyran-2-carboxaldehyde. The invention also relates to certain polymerizable, unsaturated esters of the present carboxylic acids, and to products of the polymerization of such esters.

The novel compounds, tetrahydropyran-2-carboxylic acid and 3,4-dihydro-1,2-pyran-2-carboxylic acid, provided by the present invention are useful as ingredients in various compositions in the arts, and also as organic acids adapted to conversion to useful new salts, esters, and similar derivatives. Tetrahydropyran-2-carboxylic acid is of particular value because it has been found that its cyclic ethereal structure and the attachment of the carbonyl group to the carbon atom adjacent to the ethereal oxygen atom render the compound highly adaptable to the economical preparation of derived organic compounds such as through fission of the tetrahydropyran ring, fission generally being effected at the ethereal oxygen atom in the ring. Both of the herein described carboxylic acids, but particularly the unsaturated acid 3,4-dihydro-1,2-pyran-2-carboxylic acid, are of noteworthy value as providing basis for the production of novel unsaturated esters that are useful as raw materials for the preparation of resins and similar products of polymerization. The provision of these carboxylic acids and their derivatives as mentioned, therefore, is one of the principal objects accomplished by the present invention.

In accordance with the process of the present invention, 3,4-dihydro-1,2-pyran - 2 - carboxylic acid is prepared from the related compound, 3,4-dihydro-1,2-pyran-2-carboxaldehyde, which is known in the art and readily available. In order to utilize advantageously this easily obtainable starting material, it is, of course, essential that a process be effected without substantial degradation, or other reaction of the pyran ring during the preparation of the 3,4-dihydro-1,2-pyran-2-carboxylic acid. However, 3,4-dihydro-1,2-pyran-2-carboxaldehyde, possibly because of its unsaturated character, is highly reactive and readily undergoes side reactions under conditions generally employed for the oxidation of formyl compounds to the corresponding carboxylic acids. In fact, oxidative treatments of the above-stated dihydropyran compound heretofore have led to substantially quantitative conversion of the 3,4-dihydro-1,2-pyran-2-carboxaldehyde into products of such side reactions. A further principal object of the present invention therefore is the provision of a process for the preparation of 3,4-dihydro-1,2-pyran-2-carboxylic acid utilizing oxidative treatment of 3,4-dihydro-1,2-pyran-2-carboxaldehyde under conditions that provide a minimum of possible side or degradative reactions. Also included among the objects of the present invention is the provision of conditions for oxidation of 3,4-dihydro-1,2-pyran-2-carboxaldehyde to the corresponding carboxylic acid in high yield and in the absence of substantial degradation of either reactant or the desired reaction product. A still further object of the invention is the provision of a process whereby tetrahydropyran-2-carboxylic acid may be prepared in high yield and in a direct manner from 3,4-dihydro-1,2-pyran-2-carboxaldehyde via 3,4-dihydro-1,2-pyran-2-carboxylic acid.

A further, related object accomplished by the present invention is the provision of valuable new unsaturated esters of the herein described carboxylic acids. Such esters, particularly the esters of 3,4-dihydro-1,2-pyran-2-carboxylic acid, are of wide value as in the preparation of resinous or other high molecular weight products of polymerization, as hereinafter described.

In accordance with the process of the present invention, these and similar objects which will be apparent herein, are realized by oxidizing 3,4-dihydro-1,2-pyran-2-carboxaldehyde to the corresponding carboxylic acid, 3,4-dihydro-1,2-pyran-2-carboxylic acid, without degradation of the dihydropyran nucleus, and saturating with hydrogen the dihydropyran ring to provide the novel compound, tetrahydropyran-2-carboxylic acid. It has been discovered unexpectedly that 3,4-dihydro-1,2-pyran-2-carboxaldehyde may be oxidized to the corresponding carboxylic acid, 3,4-dihydro-1,2-pyran-2-carboxylic acid, in high yield and without degradation of the dihydropyran ring by treating the stated dihydropyran carboxaldehyde in a substantially anhydrous organic solvent medium and at temperatures generally upwards from ordinary room temperatures with an oxidizing agent adapted to oxidize the formyl group to a carboxyl group under the conditions employed. The dihydropyran carboxylic acid thus produced then may be converted by hydrogenation of the pyran ring to tetrahydropyran-2-carboxylic acid.

In accordance with the process of the present invention, 3,4-dihydro-1,2-pyran-2-carboxaldehyde is treated with a suitable oxidizing agent in a substantially anhydrous organic solvent medium. A variety of organic solvents may be used to provide the reaction medium. If, as is generally the case, it is desired to avoid reaction between the solvent and one or both of the reactants, the selected solvent should be inert under the conditions of reaction. Suitably inert solvents are, for example, the normally liquid aliphatic saturated hydrocarbons, normally liquid aromatic hydrocarbons, ethers, particularly the saturated ethers, and the like. Benzene, toluene, the xylenes, the hexanes, the heptanes, diethyl ether, diisopropyl ether, isopropyl ethyl ether, dioxane, and similar organic solvents thus all may be employed. Generally, it is preferable to employ an organic solvent having a boiling point at atmospheric pressure above about 70° C. Aromatic hydrocarbon solvents such as benzene, toluene, xylene and the like therefore are particularly suited for use in the present process.

The organic solvent medium should be substantially anhydrous; that is, the reaction should be effected in the absence of added water. The amounts of water ordinarily present in commercial grades of the indicated solvents have been found not to have deleterious effects upon the outcome of the present process, nor have the quantities of water formed by reaction in the process. Larger amounts of water, however, particularly if the reaction medium contains any unneutralized acidic material during or after reaction, are liable to reduce materially the yield of the desired reaction product, and hence generally are to be avoided.

The amount of organic solvent medium employed is not highly critical, and may be varied within relatively wide limits in order best to accomplish the objectives of the invention. There desirably is employed an amount of organic solvent medium corresponding to from about 3 to about 25 times the weight of 3,4-dihydro-1,2-pyran-2-carboxaldehyde, a preferred range being from about 5 to about 15 times the weight thereof.

In effecting the process of the present invention, the 3,4-dihydro-1,2-pyran-2-carboxaldehyde and the oxidizing agent may be brought into reactive contact in the organic solvent medium in any suitable manner. In the case of normally solid oxidizing agents such as silver oxide, the 3,4-dihydro-1,2-pyran-2-carboxaldehyde may be dissolved in the organic solvent and the oxidizing agent mixed therewith, preferably with efficient agitation, and the reaction allowed to proceed. Or the oxidizing agent may be added gradually to the organic solvent medium containing the 3,4-dihydro-1,2-pyran-2-carboxaldehyde, the oxidizing agent being added either in the dry state or dispersed or suspended in a further quantity of the organic solvent. In the case of gaseous oxidizing agents, such as air, ozone, oxygen, etc., the gaseous agent may be passed through or otherwise contacted with an organic solvent solution of the 3,4-dihydro-1,2-pyran-2-carboxaldehyde, the time and rate of addition or contact of gaseous oxidizing agent being so regulated as to provide the desired oxidative reaction. Other possible modes of bringing the 3,4-dihydro-1,2-pyran-2-carboxaldehyde and the oxidizing agent into reactive contact will be apparent to those skilled in the art and may be employed, if desired.

The amount of oxidizing agent that is employed in accordance with the present invention is an amount sufficient to oxidize the 3,4-dihydro-1,2-pyran-2-carboxaldehyde to the corresponding carboxylic acid in satisfactory yield. For example, when silver oxide is employed as the oxidizing agent, there preferably is employed from about 0.75 to about 1.5 moles silver oxide per mole of the compound to be oxidized. Larger amounts may be employed. However, it may be found that the reaction is excessively violent in case such larger amounts are employed, particularly if all of the solid oxidizing agent is added at one time. Regulation of the reaction may be obtained, for example, by controlled addition of the oxidizing agent or of the 3,4-dihydro-1,2-pyran-2-carboxaldehyde to the reaction mixture, by suitable cooling of the reaction mixture, and by similar means. In the case of gaseous oxidizing agents such as air, oxygen, oxygen-enriched air, etc. catalyzed by catalytically active metal compounds such as salts or oxides of cobalt, manganese, vanadium, etc., the rate and duration of contact may be so regulated as to obtain the desired extent of reaction, the optimum rate and duration depending in any given instance upon the intimacy of contact, the specific oxidizing agent used, and similar factors. When gaseous oxidizing agents are employed, sufficient alkali such as solid sodium carbonate, etc. should be added to maintain the reaction mixture substantially free of any unneutralized acid. Heat generated by the reaction may be dissipated as by reflux distillation of the organic solvent reaction medium or by other means such as cooling coils located inside or outside the reaction vessel, and the like. The reaction may be effected over a relatively wide range of temperatures, from temperatures somewhat below ordinary room temperatures to temperatures considerably in excess thereof. The temperature of reaction advantageously is maintained between ordinary room temperature and about 150° C., the more limited range of from about 40° C. to about 125° C. being preferred. The time required for completion of the oxidation reaction depends upon the other variables such as temperature, and the like, and may be varied from one or two hours up to, say, twenty to twenty-five hours at lower reaction temperatures.

After completion of the oxidation treatment, the carboxylic acid 3,4-dihydro-1,2-pyran-2-carboxylic acid, is present in the reaction mixture in the form of a salt, mixed with any unreacted metal oxide, alkali, catalyst, etc. The free acid is relatively unstable. The 3,4-dihydro-1,2-pyran-2-carboxylic acid, therefore is most advantageously retained in the form of a suitable salt. For example, when 3,4-dihydro-1,2-pyran-2-carboxaldehyde is oxidized by treatment with silver oxide in an anhydrous medium, the silver salt of 3,4-dihydro-1,2-pyran-2-carboxylic acid that is formed by such oxidation either may be retained as such, or it may be converted to a salt of another metal by any suitable means such as by metathetical reaction, etc. It is to be understood that in the present specification and in the appended claims, reference to the carboxylic acid 3,4-dihydro-1,2-pyran-2-carboxylic acid and tetrahydropyran-2-carboxylic acid, when made without further qualification, is intended to include the respective acid as it exists either in the free form or in the form of a salt.

In accordance with the process of the present invention it is not necessary to convert the dihydropyran carboxylic acid salt thus obtained to the free acid, and in the preferred case it is desirable not to do so. When 3,4-dihydro-1,2-pyran-2-carboxaldehyde has been oxidized by means of a silver oxide oxidizing agent, the product of oxidation may be treated directly to form novel esters of 3,4-dihydro-1,2-pyran-2-carboxylic acid without isolation of the free acid. Alternatively, the product may be hydrogenated to obtain the saturated acid, tetrahydropyran-2-carboxylic acid or a salt thereof, also without intervening isolation of the free acid, 3,4-dihydro-1,2-pyran-2-carboxylic acid.

If it is desired to prepare the saturated acid, tetrahydropyran-2-carboxylic acid, the dihydropyran ring of the 3,4-dihydro-1,2-pyran-2-carboxylic acid or a derivative thereof may be saturated with hydrogen by any effective method for saturation of the dihydropyran ring. Treatment with molecular hydrogen in the presence of an active hydrogenation catalyst generally is to be preferred. Hydrogenation of the dihydropyran ring thus may be effected by treatment with molecular hydrogen in the presence of an active hydrogenation catalyst, such as one comprising platinum, palladium or nickel, and the like. A preferred catalyst is the nickel catalyst known as Raney nickel prepared according to the Raney patent, U. S. 1,628,190. Hydrogenation of the dihydropyran ring desirably is effected at or near room temperatures, although temperatures up to about 100° C. or higher may be employed. Hydrogen pressures of from about 500 to about 5000 pounds per square inch are satisfactory, a preferred range being from about 500 to about 2000 pounds per square inch.

Hydrogenation of the dihydropyran ring may be effected by adding a suitable hydrogenation catalyst directly to the product obtained by oxidation of 3,4-dihydro-1,2-pyran-2-carboxaldehyde and exposing the mixture to hydrogen gas under the foregoing conditions of temperature and pressure. Alternatively, the crude product of oxidation may be treated so as to obtain an ester of 3,4-dihydro-1,2-pyran-2-carboxylic acid, and the ester subjected to hydrogenation treatment. When 3,4-dihydro-1,2-pyran-2-carboxaldehyde has been oxidized by treatment with silver oxide, as described herein, the crude product of oxidation may be treated with an alkyl halide such as a primary alkyl iodide, thereby forming an alkyl ester of 3,4-dihydro-1,2-pyran-2-carboxylic acid. The ester then may be separated from the reaction mixture and dispersed in any suitable organic solvent such as an alcohol, an ether, a paraffinic hydrocarbon, an aromatic hydrocarbon, or the like, and subjected to the action of molecular hydrogen under the above conditions and in the presence of minor amounts, say 5 to 20 per cent, of the selected catalyst. After hydrogenation treatment, the acid, tetrahydropyran-2-carboxylic acid, may be obtained either as the free acid or a salt thereof, by saponification of the product of hydrogenation.

After hydrogenation of the dihydropyran nucleus, the final product, 2-carboxytetrahydropyran, may be recovered and/or purified in any suitable way, as by fractional distillation, treatment with selective solvents, low temperature crystallization, etc. If the hydrogenation product is present as an ester, the ester may be saponified as by treatment with alcoholic potassium hydroxide, and the free acid recovered by any suitable means such as fractional distillation, etc.

In accordance with the present invention, there are provided novel, unsaturated esters of the aforesaid carboxylic acids, characterized as containing at least one carbon-to-carbon unsaturated bond in the molecule, and having desirable properties as herein described. The unsaturated carbon-to-carbon bond may be either only in the pyran ring, as in esters of 3,4-dihydro-1,2-pyran-2-carboxylic acid with a saturated aliphatic alcohol, in the ester group only, as in the herein described esters of tetrahydropyran-2-carboxylic acid with an unsaturated alcohol, or unsaturated carbon-to-carbon bonds may be present in both the pyran ring and in the extra nuclear ester group, as in the esters of 3,4-dihydro-1,2-pyran-2-carboxylic acid with unsaturated alcohols.

The unsaturated esters which thus are provided by the present invention have been found to possess unusual and valuable characteristics that render them of particular value as raw materials for the preparation of resins or of resinous products of polymerization reaction, and in related applications in the arts.

The unsaturated esters of the present invention wherein an unsaturated carbon-to-carbon bond is present only in the pyran ring are most favorably represented by the alkyl esters of 3,4-dihydro-1,2-pyran-2-carboxylic acid, such as the methyl, ethyl, propyl, isopropyl, butyl, pentyl, hexyl, heptyl, and analogous and homologous esters thereof. Also included in this class are the cycloalkyl esters of 3,4-dihydro-1,2-pyran-2-carboxylic acid, such as the cyclopentyl, cyclohexyl, methylcyclopentyl, cyclohexylethyl, and similar esters wherein the ester group contains one or more saturated cycloaliphatic structures.

Those esters of the present invention of wherein the ester group contains an unsaturated carbon-to-carbon bond are represented by the esters of 3,4-dihydro-1,2-pyran-2-carboxylic acid and of tetrahydropyran-2-carboxylic acid wherein the ester group comprises an organic radical containing at least one aliphatic carbon-to-carbon multiple bond. Among these novel esters are included the alkenyl esters, the cycloalkenyl esters, the alkadienyl esters, the alkynyl esters, and similar esters wherein there is present in the esterifying radical, or group, i. e., in the organic radical that has replaced the carboxylic hydrogen atom of the free carboxylic acid, at least one nonaromatic carbon-to-carbon multiple bond.

The unsaturated esters of this latter class are most advantageously exemplified by the allylic esters of 3,4-dihydro-1,2-pyran-2-carboxylic acid and of tetrahydropyran-2-carboxylic acid or, in other words by the 2-alkenyl esters thereof. The esters of this preferred class may be characterized as having structures corresponding to the formula

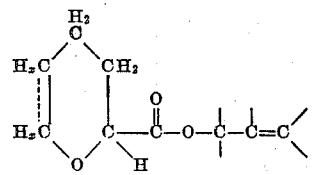

wherein $x$ has a value of 1 or 2, the carbon atoms in the 5 and 6 positions of the pyran ring being olefinically bonded when $x$ equals 1, and singly bonded when $x$ equals 2.

In the foregoing formula, the free bonds at the carbon atoms in the ester group may be satisfied by various atoms or groups of atoms, such as hydrogen, halogen, organic radicals, and the like. A preferred class of unsaturated esters corresponding to the foregoing formula comprises those esters wherein the ester group contains a terminal methylene group, as in the esters which correspond to the formula

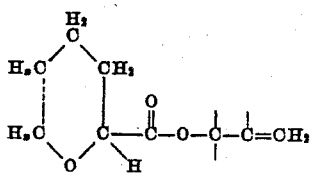

A large number of valuable esters which contain an unsaturated carbon-to-carbon bond in the ester group are provided by the present invention. Representative esters of 3,4-dihydro-1,2-pyran-2-carboxylic acid that are provided include, for example, the allyl, the 2-methylallyl, the crotyl, the 2-ethylallyl, the 2,3-dimethylcrotyl, the 1,2-dimethylallyl, the 2-isopropyl-3-ethylcrotyl, the 1-chloroallyl, the 1-(chloromethyl)allyl, the 2-chlorocrotyl, the 3-bromoallyl, the 1,1-dimethyl-2-chloroallyl, the 3-chloroallyl, the 1-methylallyl, the 2-butylallyl, the 2-phenylallyl, the 3-phenylallyl, the 1-phenylallyl, the 1-methyl-2-tolylallyl, the 3-(chlorophenyl)-allyl, the 2-(dichlorophenyl)crotyl, the 3-naphthylallyl, and analogous and homologous esters of 3,4-dihydro-1,2-pyran-2-carboxylic acid with allyl alcohol or a substituted allyl alcohol. Other esters of 3,4-dihydro-1,2-pyran-2-carboxylic acid which contain a non-aromatic unsaturated carbon-to-carbon bond in the esterifying radical are, for example, the vinyl ester, the isopropenyl ester, the 1,3-butadienyl ester, the cyclohexenyl esters, etc. The esters of 3,4-dihydro-1,2-pyran-2-carboxylic acid wherein the esterifying radical is acyclic are a preferred class of esters provided by the present invention. The allyl ester of 3,4-dihydro-1,2-pyran-2-carboxylic acid presents particular advantages, and hence is a preferred species of the class.

Corresponding esters of the saturated acid, tetrahydropyran-2-carboxylic acid, also are provided by the present invention, such esters including those that correspond to the specific esters of 3,4-dihydro-1,2-pyran-2-carboxylic acid referred to immediately above, as well as analogous and homologous esters of tetrahydropyran-2-carboxylic acid corresponding to the herein defined more general class.

The esters provided by the present invention may be prepared from the respective carboxylic acids 3,4-dihydro-1,2-pyran-2-carboxylic acid and tetrahydro-pyran-2-carboxylic acid, or suitable derivatives thereof, by most of the methods of preparing esters known to the art. In certain cases, the esters of tetrahydropyran-2-carboxylic acid may be prepared by direct esterification reaction between the carboxylic acid and the appropriate alcohol. However because of its instability when in the free state, the unsaturated acid 3,4-dihydro-1,2-pyran-2-carboxylic acid is less suited to direct esterification reaction with an alcohol, and therefore preferably is employed in the form of a suitable derivative. Because of the reactive character of the present carboxylic acids and/or the alcohols that would be required for preparation of the present esters by direct esterification reaction, it may be preferable in certain cases to obtain the esters of the invention by means of a suitable indirect esterification method. A highly effective method of preparing the present novel esters comprises reacting a metal salt such as a silver salt of the selected carboxylic acid with an organic halide corresponding to the ester desired. For example, the esters corresponding to the foregoing preferred class comprising the allylic esters of 3,4-dihydro-1,2-pyran-2-carboxylic acid, may be prepared by suitable reaction between a silver, lead or other suitable metal salt of 3,4-dihydro-1,2-pyran-2-carboxylic acid and an organic halide of the general formula

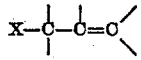

wherein X signifies a halogen atom such as iodine, chlorine, bromine, etc. The reaction may be effected by heating the silver salt of the carboxylic acid and the organic halide at temperatures of from about 50° C. to about 150° C. in the presence of an inert organic solvent such as benzene, toluene, etc., and recovering the resultant ester by any suitable means such as by fractional distillation or otherwise. Amounts of organic solvent medium corresponding to from about 10 to about 50 parts per part of the silver salt may be employed. The relative amounts of the unsaturated halide and of the salt of the carboxylic acid salt may be varied widely, and either one may be employed in excess. Preferably, however, the halide is employed in molar excess, thereby providing maximum yields of ester based on the carboxylic acid salt.

Esters of the present invention also may be prepared conveniently by ester interchange reaction or by similar processes known to the art. The present esters wherein there is present in the ester group at least one unsaturated carbon-to-carbon bond may be prepared by reacting the corresponding alkyl ester with the desired unsaturated alcohol or with a suitable ester thereof, such as a fatty acid ester of the unsaturated alcohol, whereby the alkyl group of the alkyl ester is replaced by the unsaturated group derived from the alcohol. Metal alcoholates of the unsaturated alcohol, such as the sodium alcoholates, may be employed to catalyze the reaction. Other suitable catalysts and/or heat may be utilized to promote the interchange of groups leading to formation of the desired ester.

Although the foregoing represent advantageous methods of preparing the present novel esters, it will be appreciated that other methods may be employed if desired, and that the present invention relates to the novel esters regardless of the method employed for their preparation.

The unsaturated esters provided by the present invention have been found to have particular value and utility as raw materials for the preparation of improved resins and other products of polymerization reaction. The provision of methods for effecting such polymerization reactions, and the novel products thereby produced, constitute a further aspect of the present invention.

It has been discovered that the characteristics of the present unsaturated esters from the standpoint of their use in the preparation of polymeric products, depend upon the position of the unsaturated carbon-to-carbon bonds in the molecule. They may be distinguished according to whether there is an unsaturated carbon-to-carbon bond present in the dihydropyran ring only, in the ester group only, or in both the ester group and the dihydropyran ring.

The alkyl and cycloalkyl, and similar esters of 3,4-dihydro-1,2-pyran-2-carboxylic acid wherein an unsaturated carbon-to-carbon bond is present in the dihydropyran ring only, may be utilized for the preparation of novel and improved products of polymerization reaction by subjecting the esters to effective conditions of polymerization, either as the sole polymerizable material, or in conjunction with one or more additional polymerizable substances. The polymerization reaction is thought to occur primarily by reaction at the unsaturated carbon-to-carbon bond of the dihydropyran ring. The products of polymerization have the characteristics of complex alkyl or cycloalkyl esters of high molecular weight polycarboxylic acids. When the esters of 3,4-dihydro-1,2-pyran-2-carboxylic acid wherein the esterifying group contains no carbon-to-carbon multiple bond are employed as the sole polymerizable material or materials, there may be obtained thermoplastic, non-heat hardenable products which, depending upon the conditions of polymerization, the agency used for effecting polymerization, and similar factors, range in character from viscous liquids to brittle solid materials. The characteristics of the polymerization products may be modified advantageously by the selection and inclusion in the polymerization mixture of other substances copolymerizable with the stated esters.

As the catalyst for promoting the polymerization of the alkyl and similar esters of 3,4-dihydro-1,2-pyran-2-carboxylic acid, there may be employed advantageously polymerization catalysts such as catalytically effective inorganic compounds of metals, or metallo-organic compounds that are effective in promoting the polymerization reaction. Catalysts consisting of or comprising a compound, preferably a halide such as a chloride or fluoride, of a metal of Group II or Group III of the Periodic Table of the Elements are particularly suitable. Representative of the catalysts which thus may be employed effectively for promoting the polymerization of the alkyl and similar esters of 3,4-dihydro-1,2-pyran-2-carboxylic acid are, for example, boron trifluoride, aluminum chloride, zinc chloride, stannous chloride, magnesium chloride, and the like. Mixtures of catalytically active materials may be employed to promote the polymerization reaction, such as mixtures comprising a compound of a metal of Group II or Group III of the Periodic Table and a compound of another metal such as vanadium, nickel, chromium, iron, cobalt, etc. Particularly effective results have been obtained by polymerizing the esters within the present class in the presence of the product obtained by dissolving boron trifluoride in an ether such as diethyl ether to form a boron trifluoride-ether complex containing about 45 per cent boron trifluoride.

The polymerization of the alkyl and similar esters of 3,4-dihydro-1,2-pyran-2-carboxylic acid may be effected in the presence of a suitable catalyst and with the monomeric ester in either the massive state, or dissolved or dispersed in a suitable solvent or non-solvent therefor. Particularly desirable results have been obtained by polymerizing the monomeric ester dissolved in from about 0.5 to about 5.0 times its weight of an inert organic solvent such as benzene or toluene. Heat may be employed to accelerate or to activate the polymerization reaction. Temperatures of from about $-10°$ C. to about $+65°$ C. thus may be employed, a particularly convenient range of temperature being from about $0°$ C. to about $25°$ C. Amounts of catalyst corresponding to from about 1% to about 20% by weight of the monomeric ester may be employed, the optimum amount of catalyst depending upon the identity of both the catalyst and the ester, and upon the conditions under which the polymerization reaction is effected.

The polymerization may be only partially completed under the aforesaid conditions, if desired. The partially polymerized esters may be used as ingredients in surface coatings, adhesives, impregnating media, and the like, and polymerization completed in situ. The products resulting from the polymerization treatment may be subjected to suitable saponification conditions, as by treatment with dilute aqueous or alcoholic solutions of alkalies, to provide novel complex polycarboxylic acids by saponification of part or all of the ester groups. When the polymerization has been effected in a dispersing medium such as a solvent, the dispersing medium and the polymeric products may be separated as by treatment with selective solvents or by evaporation, to provide the polymeric products in relatively pure state.

The present esters of 3,4-dihydro-1,2-pyran-2-carboxylic acid which contain an unsaturated carbon-to-carbon bond in the ester group as well as in the dihydropyran ring have the unique and advantageous characteristic of being subject to polymerization by reaction at either or both the olefinic bond of the dihydropyran ring or the carbon-to-carbon multiple bond present in the ester group, depending upon the means and conditions employed for effecting polymerization. Elevated temperatures, light, oxygen, ozone, organic peroxides, and the like may be employed to promote polymerization reaction thought to occur predominantly through reaction at the unsaturated carbon-to-carbon bonds of the ester group. Catalysts such as the catalytically active compounds of metals referred to hereinbefore also may be employed to promote polymerization reaction of the esters of 3,4-dihydro-1,2-pyran-2-carboxylic acid which contain an unsaturated carbon-to-carbon bond in the ester group. Desirable modifications in the properties of the polymeric products may be obtained by the use of mixtures of catalysts of the foregoing types.

When catalysts such as the active compounds of metals referred to hereinbefore are employed, the polymerization of the esters of 3,4-dihydro-1,2-pyran-2-carboxylic acid which have an unsaturated carbon-to-carbon bond in the ester group may, in general, be effected under conditions similar to those utilized for polymerization of the alkyl esters of 3,4-dihydro-1,2-pyran-2-carboxylic acid. However, under otherwise identical conditions, the allyl and similar esters of 3,4-dihydro-1,2-pyran-2-carboxylic acid have, in general, been found to form softer, tackier products of polymerization than the alkyl esters of the same carboxylic acid. The relatively soft products thus obtained are heat hardenable, and are eminently suited to use, for example, as heat hardenable ingredients of surface coatings and the like.

The unsaturated esters of tetrahydropyran-2-carboxylic acid also find valuable application as materials useful for the preparation of products of polymerization reaction. The esters of this class may be subjected to conditions effective for promoting polymerization reaction, such as those referred to hereinbefore, to provide novel products which have certain of the general characteristics of polymeric esters of allylic alcohols, but which have novel and advantageous properties due to the presence of the tetrahydropyran ring in their structure.

The present unsaturated esters also may be copolymerized with other reactive ethylenic compounds, such as dienes, vinyl compounds, acrylyl compounds, etc. Vinyl chloride, butadiene, vinyl acetate, acrylic acid, methacrolein, acrolein, chloroacrylic acid, diallyl phthalate, styrene, methyl methacrylate, methyl acrylate, pentadienes, and the like thus are among the numerous compounds with which the esters of the present invention advantageously may be copolymerized.

The following examples will serve to illustrate certain preferred embodiments of the invention. It will be understood that the examples are not intended to limit the scope of the invention other than as it is defined in the appended claims.

*Example I*

One hundred sixty-five parts by weight of 3,4-dihydro-1,2-pyran-2-carboxaldehyde, 464 parts of silver oxide, and 1100 parts of benzene were stirred together in a reaction vessel provided with a reflux condenser. The temperature rose slowly to 40° C. in 3 hours, and then rose rapidly to the boiling point of the mixture. After an additional 25 minutes, and after reaction had stopped, the mixture was filtered. The solid product, a mixture of silver and of the silver salt of 3,4-dihydro-1,2-pyran-2-carboxylic acid, was heated with 500 parts of benzene to reflux temperature, and 260 parts of ethyl iodide were added. After 1.5 hours at the boiling point, the mixture was filtered and subjected to distillation. There were recovered 138 parts of 2-carbethoxy-3,4-dihydro-1,2-pyran, distilling at 80.4 to 84.2° C. under a pressure of 10 millimeters of mercury, and having a refractive index (N 20/D) of 1.4549, in 71.5% yield.

*Example II*

Twenty parts of 2-carbethoxy-3,4-dihydro-1,2-pyran, prepared as in the preceding experiment, were dissolved in an equal weight of petroleum ether and ⅓ part of boron trifluoride-ether complex containing 40 per cent by weight of $BF_3$ was added to the solution at 0° C. Polymerization took place rapidly. The polymer was separated by washing the solution with water and by evaporating the solvent. The polymer was a clear, yellowish, brittle thermoplastic solid. It had an ester value at 0.65 equivalents per 100 grams and a molecular weight, determined ebulliometrically in benzene, of 2650.

*Example III*

2-carbethoxy-3,4-dihydro-1,2-pyran was hydrogenated by treatment with hydrogen gas under a pressure of 1000 pounds per square inch and at a temperature of about 25° C. in the presence of Raney nickel catalyst. The product of the hydrogenation treatment was saponified with potassium hydroxide dissolved in boiling ethanol, the ethanol was removed by distillation and the residue was acidified and extracted with diethyl ether. Fractional distillation of the ether extract resulted in the separation of the free acid tetrahydropyran-2-carboxylic acid in 66 per cent yield. The free acid was a viscous, water-soluble liquid which did not solidify upon standing at ordinary temperatures. It was found to have a boiling point of 110.5° C. at 5 millimeters mercury pressure, and to have an index of refraction (N 20/D) of 1.4665.

*Example IV*

An anhydrous mixture of 77.5 parts of 2-carbethoxy-3,4-dihydro-1,2-pyran and 58 parts of allyl alcohol was treated with 1 part of sodium dissolved in 45 parts of allyl alcohol. Ethyl alcohol was distilled from the resulting solution. The residual solution was diluted with 150 parts of ether, washed with water, dried, and distilled. The allyl ester of 3,4-dihydro-1,2-pyran-2-carboxylic acid, distilling at 96° C. to 96.9° C. under a pressure of 10 millimeters of mercury, was recovered in 71% yield.

*Example V*

A boron trifluoride-ether complex containing 45 per cent $BF_3$ was added to a solution of the allyl ester of 3,4-dihydro-1,2-pyran-2-carboxylic acid dissolved in twice its weight of ether, and the mixture was maintained at 25° C. A mild reaction ensued, resulting in the formation of a soft sticky polymer. A steel strip was coated with a solution of the polymer in ether and heated at 120 to 150° C. for 40 minutes. A clear, glossy, hard, adherent coating was obtained.

We claim as our invention:

1. The allyl ester of 3,4-dihydro-1,2-pyran-2-carboxylic acid.
2. An alkenyl ester of 3,4-dihydro-1,2-pyran-2-carboxylic acid.
3. The ethyl ester of 3,4-dihydro-1,2-pyran-2-carboxylic acid.
4. An alkyl ester of 3,4-dihydro-1,2-pyran-2-carboxylic acid.
5. An ester of tetrahydropyran-2-carboxylic acid wherein the residue of the alcohol contains at least one carbon-to-carbon aliphatic multiple bond.
6. The allyl ester of tetrahydropyran-2-carboxylic acid.
7. An unsaturated ester of a carboxylic acid selected from the class consisting of 3,4-dihydro-1,2-pyran-2-carboxylic acid and tetrahydropyran-2-carboxylic acid, said ester comprising in the residue of the alcohol at least one carbon-to-carbon aliphatic multiple bond.
8. A polymer of the ethyl ester of 3,4-dihydro-1,2-pyran-2-carboxylic acid.
9. A polymer of the allyl ester of 3,4-dihydro-1,2-pyran-2-carboxylic acid.
10. A polymer of an ester of a carboxylic acid selected from the class consisting of 3,4-dihydro-1,2-pyran-2-carboxylic acid and tetrahydropyran-2-carboxylic acid, said ester in its monomeric form containing at least one carbon-to-carbon multiple bond.
11. An ester of a carboxylic acid selected from the class consisting of 3,4-dihydro-1,2-pyran-2-carboxylic acid and tetrahydropyran-2-carboxylic acid, comprising in its structure at least one carbon-to-carbon multiple bond.
12. An ester of 3,4-dihydro-1,2-pyran-2-carboxylic acid with an unsaturated alcohol, said ester containing in the residue of the alcohol a carbon-to-carbon double bond between two carbon atoms, one of said carbon atoms being directly linked to two hydrogen atoms and the other of said carbon atoms being directly linked to a saturated carbon atom that in turn is directly linked to the oxy oxygen atom of the esterified carboxyl group.
13. A process for the polymerization of the allyl ester of 3,4-dihydro-1,2-pyran-2-carboxylic acid which comprises contacting said allyl ester of 3,4-dihydro-1,2-pyran-2-carboxylic acid with boron trifluoride-ether complex at a temperature of from about −10° C. to about +65° C. to catalyze the formation of polymer.
14. A process for the polymerization of the ethyl ester of 3,4-dihydro-1,2-pyran-2-carboxylic acid which comprises contacting said ethyl ester of 3,4-dihydro-1,2-pyran-2-carboxylic acid with boron trifluoride-ether complex at a temperature of from about −10° C. to about +65° C. to catalyze the formation of polymer.

15. A process for the polymerization of an ester of an acid selected from the class consisting of 3,4-dihydro-1,2-pyran - 2 - carboxylic acid and tetrahydropyran-2-carboxylic acid, said ester in its monomeric form containing at least one carbon-to-carbon multiple bond, which comprises contacting said ester with boron trifluoride-ether complex at a temperature of from about −10° C. to about +65° C. to catalyze the formation of polymer.

RICHARD R. WHETSTONE.
SEAVER A. BALLARD.
CLARENCE J. OTT.

REFERENCES CITED

The following references are of record in the file of this patent:

UNITED STATES PATENTS

| Number | Name | Date |
|---|---|---|
| 2,242,575 | Eisleb | May 20, 1941 |
| 2,378,996 | Freure | June 26, 1945 |
| 2,382,640 | Kenyon | Aug. 14, 1945 |
| 2,436,645 | Hawkins et al. | Feb. 24, 1948 |

OTHER REFERENCES

Chem. Abst., vol. 2, page 2223 (1908); vol. 12, page 1392 (1918); vol. 32, page 5398 (1938); vol. 35, pages 6954–6956 (1941).